UNITED STATES PATENT OFFICE.

DAMON R. AVERILL, OF NEW CENTREVILLE, NEW YORK.

IMPROVEMENT IN COMPOUNDS FOR FILLING OR STUFFING SURFACES TO BE PAINTED OR VARNISHED.

Specification forming part of Letters Patent No. 121,311, dated November 28, 1871.

*To all whom it may concern:*

Be it known that I, DAMON R. AVERILL, of New Centreville, in the county of Oswego and State of New York, have invented a new and Improved Compound for Sizing or Filling Substances Preparatory to Painting, of which the following is a specification:

This invention relates to the manufacture and production of a durable and efficient sizing, coating or filling for the purpose of covering wood, stone, brick, or metal, &c., preparatory to painting, or varnishing, being peculiarly adapted to the coating of plastered or cement walls, paper, or cloth.

From several examples which may be presented I give the following formula, not confining myself to the one herein shown, or to the exact proportion specified, as the same may be varied according to the purposes required without departing from the nature of my invention: I first make a saturated solution of lime-water. Next, a solution of soluble silicate of soda, making 8° Baumé. Next, I prepare a solution of acetate of zinc as follows: I take ten pounds of the sulphate of zinc and five pounds of the acetate of lead and dissolve both in water in a suitable vessel, and reduce with water until the solution makes 3° Baumé. Then I take six gallons of the lime-water aforesaid, to which I add three gallons of the silicate of soda above named, and three gallons of the solution of the acetate of zinc formed by the interchange of acids and bases or double decomposition of the aforesaid acetate of lead and sulphate of zinc. To this mixture of the solution above mentioned is added six gallons of linseed-oil. This may be applied hot or cold as a coating or filling for the purposes before stated.

What I claim as my improvement, and desire to secure by Letters Patent, is—

The compound as herein specified, for the purpose set forth.

DAMON R. AVERILL.

Witnesses:
J. H. BURRIDGE,
W. H. BURRIDGE.